(No Model.) 2 Sheets—Sheet 1.

T. E. PROCTOR, R. WHITAKER & H. P. REED.
CONVEYING APPARATUS.

No. 327,108. Patented Sept. 29, 1885.

Witnesses,
J. A. Rennie
F. L. Emery.

Inventors,
Thomas E. Proctor,
and Robinson Whitaker,
Herbert P. Reed,
by Emery & Gregory Att'ys

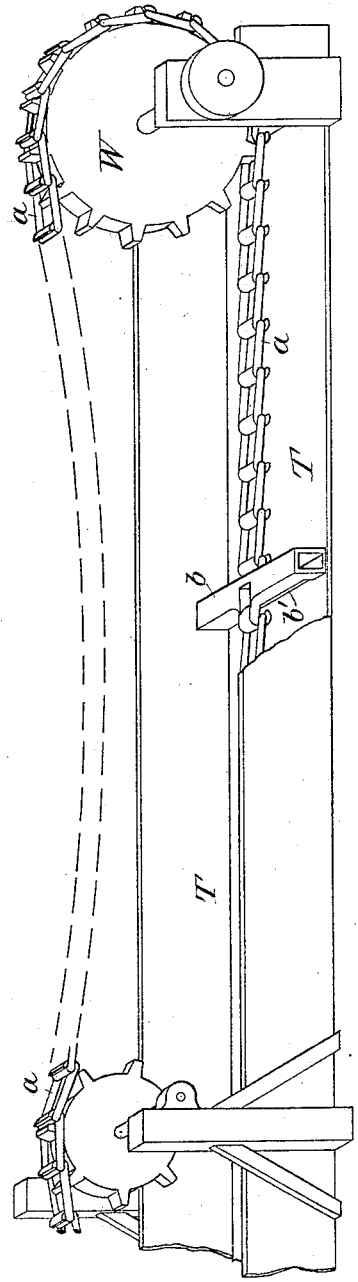

UNITED STATES PATENT OFFICE.

THOMAS E. PROCTOR, OF BOSTON, AND ROBINSON WHITAKER AND HERBERT P. REED, OF PEABODY, MASSACHUSETTS.

CONVEYING APPARATUS.

SPECIFICATION forming part of Letters Patent No. 327,108, dated September 29, 1885.

Application filed April 20, 1885. (No model.)

*To all whom it may concern:*

Be it known that we, THOMAS E. PROCTOR, of Boston, Suffolk county, and ROBINSON WHITAKER and HERBERT P. REED, both of Peabody, Essex county, State of Massachusetts, have invented an Improvement in Conveying Apparatus, of which the following description, in connection with the accompanying drawings, is a specification, like letters on the drawings representing like parts.

Our invention relates to a conveying apparatus, such as employed for conveying or moving pulverized or granulated material—such as grain, sugar, tan-bark, gravel, and the like—and is embodied in an apparatus of the class in which an endless drive-chain operated by a sprocket-wheel imparts motion to a series of conveying devices connected with the said chain, which push or drag along or scoop up the material to be conveyed, the conveying device consisting of a bucket, or a scraper or pusher, as circumstances may require.

Apparatus of this kind has been made in which the drive-chain is composed of a series of detachable links, and a portion of the said links have been provided with lugs or projections, to which the buckets or scrapers are fastened by bolts or screws. This construction is objectionable, as the said lugs are liable to be broken or the conveying devices detached therefrom, in which case a conveying device having broken away while the conveyer is in operation is likely to strike the other conveying devices and cause a very serious breakage or damage to the apparatus.

The present invention is intended to overcome this objection; and it consists, essentially, in the combination of a link of a drive-chain with a conveying device cast upon the same, the said conveying device being constructed to permit the proper engagement of the links of the chain with one another and with the actuating sprocket-wheel.

Figure 1:
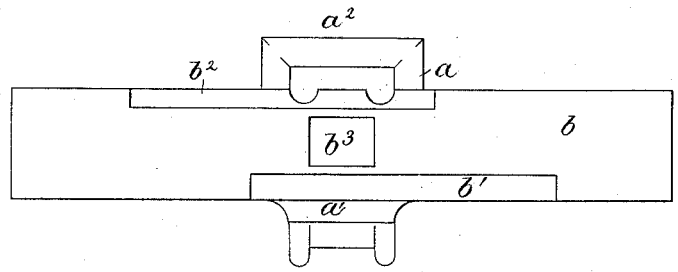
Figure 2:
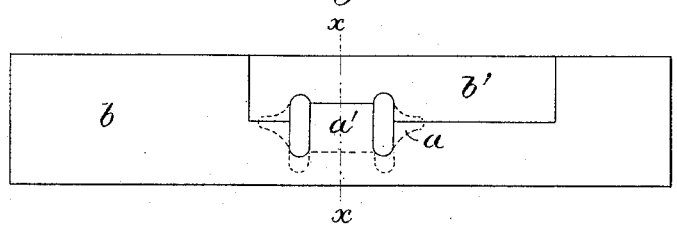
Figure 3:
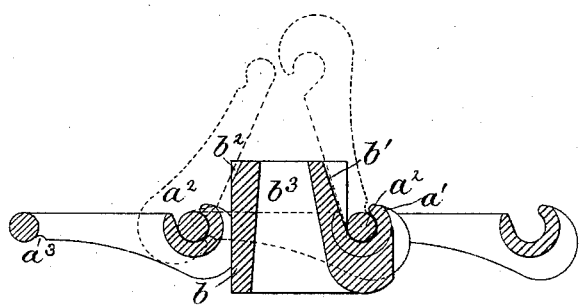

Figure 1 is a plan view of a link having a conveying device connected therewith in accordance with this invention; Fig. 2, an elevation thereof, showing also the two adjacent links; and Fig. 4, a perspective view of a portion of a conveying apparatus having conveying devices embodying this invention; Fig. 3, a transverse section on line $x\ x$.

The link $a$ of the drive-chain may be of any usual construction, it being shown as provided at one end with a hook, $a'$, to receive the bar $a^2$ of the next link of the chain, the said bar being adapted to slide endwise into the hook when the links of the chain are at a considerable angle to one another, as shown in dotted lines, Fig. 3, one of the side bars of the link having a recess, $a^3$, (see Fig. 3,) which receives the point of the hook when in such inclined position; but after the link has been slipped through sidewise into the hook and the link then turned nearly into line with the adjacent link, as shown in full lines, Fig. 3, the hook of one link enters between the side bars of the adjacent link, preventing the lateral disengagement thereof, and the hook extending more than half-way around the end bar, $a^2$, prevents it from disengagement otherwise than by such lateral movement.

The conveying device $b$, shown in this instance as a scraper to push pulverized or granular material through a trough or guide, T, (see Fig. 4,) is composed of cast metal, preferably iron, which is cast directly upon the link $a$, embedding the latter within it, and securely connecting the said conveying device and link together.

The conveying device $b$ is beveled or recessed, as shown at $b'\ b^2$, to permit the adjacent links of the chain to be engaged with the hook $a'$ and bar $a^2$ of the link $a$, that is connected with the conveying device, as shown in Fig. 3, and the said conveying device is also provided with an opening, $b^3$, to receive the teeth of the actuating sprocket-wheel W, (see Fig. 4,) which drives the chain.

In making a conveying device and link in accordance with this invention, the link, preferably made of malleable iron, is supported in a mold provided with a suitable core for the opening $b^3$, and with longitudinal cores, if desired, to reduce the weight of the conveying device $b$, the said link projecting a sufficient distance on either side of the space in the mold to afford a suitable support, after which the molten metal is poured into the mold, surrounding and embedding the link $a$ within it.

Any kind of conveying device may be connected with or form a part of a link of a drive-chain, the form of conveying device varying in accordance with the nature of the work to be done by the conveying apparatus.

As shown in Fig. 4, the conveying device $b$ moves in a substantially horizontal trough or guide, T, and operates to drag the material to be conveyed from one point to another at nearly the same level; but it is obvious that the invention is applicable to apparatus in which the conveying devices consist of buckets for raising material from a lower to a higher level.

We claim—

1. In a conveying apparatus, a cast-metal conveying device combined with a link of a drive-chain embedded in the said conveying device, substantially as described.

2. The combination of a detachable link of a drive-chain with a conveying device recessed to permit the adjacent links of the drive-chain to be engaged with the said link, substantially as described.

3. The combination of a link of a drive-chain with a conveying device provided with an opening to receive the teeth of an actuating sprocket-wheel, substantially as described.

In testimony whereof we have signed our names to this specification in the presence of two subscribing witnesses.

THOMAS E. PROCTOR.
ROBINSON WHITAKER.
HERBERT P. REED.

Witnesses:
A. M. WILKINSON,
GEO. HOLMAN.